Nov. 29, 1932.  O. W. SWANSON  1,889,228
FOWL FEATHER PICKING APPARATUS AND PROCESS
Filed Nov. 3, 1930
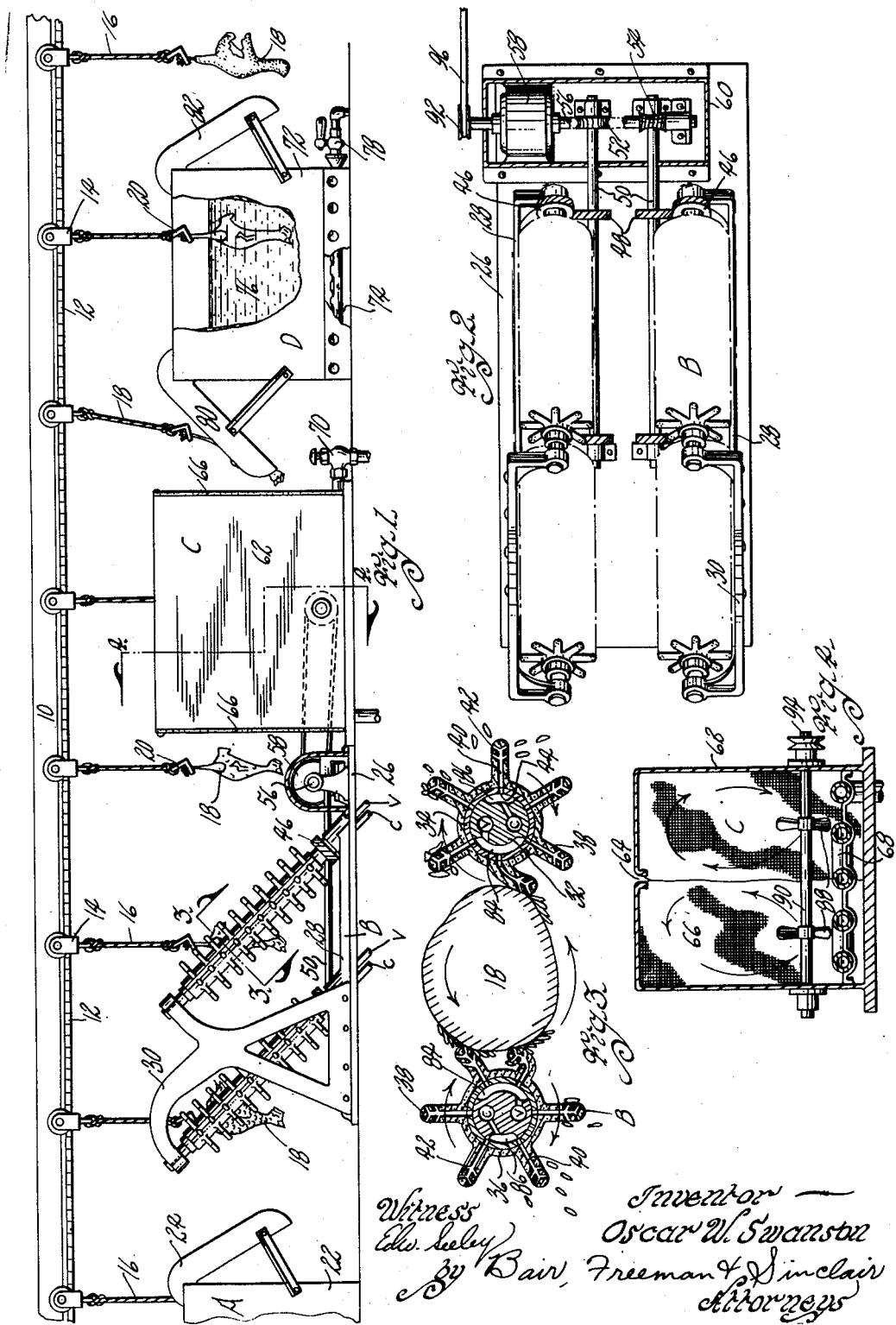

Patented Nov. 29, 1932

1,889,228

UNITED STATES PATENT OFFICE

OSCAR W. SWANSON, OF OTTUMWA, IOWA

FOWL FEATHER PICKING APPARATUS AND PROCESS

Application filed November 3, 1930. Serial No. 493,062.

The object of my invention is to provide a fowl picking apparatus which is simple, durable and comparatively inexpensive to manufacture.

A further object is to provide an apparatus which effectively performs picking operations on fowls which have been scalded or semi-scalded in any type of scalding vat, such as the scalding machine shown in the Barker and Bruce patent issued June 5, 1928, No. 1,672,555.

More particularly, it is an object of my invention to provide a mechanical picking means for the fowls after they come from the scalding machine, which effectively removes most of the feathers therefrom so that the fowl can be subsequently dryed and then dipped in a substance reduced to fluid by heat, such as paraffin whereby to coat the fowl so that after it is removed from the substance, the atmosphere will harden the coating whereupon the fowl can easily be "pealed" by hand of the paraffin coating, which brings with it all remaining feathers, pin feathers and hair.

A further object is to provide a mechanical picking means consisting of rollers provided with hollow and perforated fingers, preferably of resilient material, whereby a vacuum line can be connected with the fingers in such a way as to exhaust air therefrom and pick feathers from a fowl and retain the feathers on the fingers during a portion of each revolution of the rollers and to provide a compressed air means for discharging the feathers from the fingers during another portion of each revolution thereof.

A further object is to provide a process for picking feathers from fowls comprising moving of the fowls between hollow perforated resilient picking fingers, a means being provided for producing a suction through the picking fingers whereby to pick feathers from the fowls and a means being provided for discharging the feathers from the picking fingers by introducing compressed air thereinto.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a fowl picking apparatus embodying my invention.

Figure 2 is a plan view of the mechanical feather picking mechanism of the apparatus.

Figure 3 is a sectional view on the line 3—3 of Figure 1 showing the relation of the mechanical feather picking mechanism to a fowl and Figure 4 is a sectional view on the line 4—4 of Figure 1 illustrating a drying mechanism of the apparatus.

On the accompanying drawing, I have used the reference numeral 10 to indicate a supporting conveyor track. A moving chain 12 is arranged beneath the track 10 and is propelled in any suitable manner, as for instance by means of an electric motor (not shown). Wheeled yokes 14 travel along the track 10 and are connected with the chain 12 for movement therewith. By means of a flexible connection 16, a fowl 18 may be supported by a shackle 20 from each yoke 14.

The conveyor chain 12 is arranged to move fowls from a "sticking operator" to a scalding machine A, the discharge end of the tank of which is indicated by the reference numeral 22. The fowls are scalded or semi-scalded, as the case may be, in the machine A and are discharged therefrom down a chute 24. From the scalding machine A, the fowls are carried successively to a mechanical feather picking machine B, a dryer C and a coating mechanism D.

The mechanism B includes a base 26 having secured thereto, bearing brackets 28 and 30. Stationary shafts 32 are supported by the brackets 28 and 30. Rollers are rotatably mounted on the stationary shafts 32 and each comprises preferably a metallic cylinder 34 and a rubber or composition covering 36 vulcanized or otherwise secured to the outer surface thereof.

A plurality of resilient fingers 38 project from the rubber covering 36. The fingers 38 are tubular, passageways 40 being provided in them and are perforated, as indicated at 42. The cylinders 34 are perforated, as indicated at 44, to correspond with the passages 40 in the fingers 38. For rotating cylinders 34 and consequently the rollers and the fingers 38, any suitable means may be provided, as spiral gears 46 mounted on the cylinders 34 and coacting spiral gears 48 mounted on drive shafts 50. Each drive shaft 50 is provided with a worm gear 52 and a worm 54 is in mesh with each worm gear. The worms 54 are connected with a motor shaft 56 of a motor 58, which is housed in a casing 60.

The drying mechanism C consists of a casing 62 having its top longitudinally slotted, as at 64, for the passage of the flexible elements 16 therethrough. Each end of the casing 62 is provided with a pair of flexible curtains 66 of canvas or the like, which are arranged edge to edge in a vertical line below the slot 64.

For heating the air in the casing 62 and thus hastening the drying operation of the fowl, a steam or hot water pipe or the like 68 may be provided. A control valve 70 is illustrated as a means for controlling the admission of steam or hot water to the coil 68. The valve 70 may be thermostatically controlled for maintaining an even temperature within the drying chamber 62, if desired.

The mechanism D consists of a tank or vat 72 adapted to contain paraffin or a similar substance, which can be reduced to a fluid state by heat.

A gas burner 74 is utilized for heating the substance 76 within the vat 72 and a gas control valve 78 is illustrated in connection with the burner 74. The valve 78 may be thermostatically controlled according to the temperature of the substance 76, if desired.

Suitable entrance and discharge chutes 80 and 82 may be provided in connection with the vat 72 to facilitate drawing the fowls into the vat and removing them therefrom.

*Practical operation*

In the operation of my apparatus, the scalded or semi-scalded fowls 18 are conveyed by the conveyor chain 12 from the scalding machine A to a position between the pairs of picking rollers, which are a part of the mechanical feather picking mechanism B. As best shown in Figure 3, rotation is imparted to each of the pairs of rollers so that they rotate in the same direction and consequently tend to rotate the fowl 18 between them, as the feather picking operations proceed. The fingers 38 upon coming in contact with the feathers of the fowl will draw the feathers against the perforations of the fingers because of vacuum ports 84 formed in the shafts 34 and from which air is exhausted by the vacuum line v. When the opening 44 for any particular finger rotates to a position where it does not communicate with the vacuum port 84, some of the feathers will drop from the fingers and the rest can be readily removed by introducing compressed air from a compressed air line c to compressed air ports 86, as best shown in Figure 3 of the drawing.

Instead of using the fingers 38 to rotate the fowl, the fowl may be rotated by a mechanical means if desired, which acts upon the shackle 20 to rotate it while the fowl is between the feather picking rollers. After the greater percentage of the feathers have been removed from the fowl by the picking fingers 38, the fowl is carried by the conveyor through the drying chamber C, the fabric ends 66 of which open to allow entrance and exit of the fowl to and from the drying chamber without a prohibitive loss of heat from the chamber. A circulating means, such as fans 88 within the casing 62 and secured to a shaft 90 may be provided for circulating the drying air in the casing 62 if desired. By means of pulleys 92 and 94 and a belt 96, the motor 58 can be used for rotating the fans 88.

The conveyor chain 12 moves the fowl 18 from the drying chamber C up the chute 80 and into fluidified substance 76 in the vat 72. The drying operation is performed so as to eliminate any water on the skin of the fowl which has been deposited thereon by the scalding machine A and which would have a tendency to prevent the paraffin substance 76 from adhering to the skin of the fowl.

As the conveyor chain 12 advances onward, the fowls are withdrawn from the vat 72 and slide down the chute 82 whereafter they are exposed to the cool air of the atmosphere, which solidifies the paraffin coating on the fowl whereupon the coating may be easily "pealed" from the fowl, bringing the remaining feathers, pin feathers and hair with it.

It will be noted that all the operations performed by the apparatus are mechanical and automatic until the fowls leave the vat 72. A single operator can then "peal" the coating from the fowls and can perform this operation on a great number of fowls per day.

The process involved consists of picking the feathers from the fowls by a vacuum connection with the hollow perforated resilient picking fingers, the fingers being moved relative to the fowl and in certain positions of the fingers discharging the feathers therefrom by compressed air. This process works effectively to pick the greater portion of the feathers from the fowls.

Some changes may be made in the construction and arrangement of the parts of my device and the process may be somewhat varied without departing from the real spirit and purpose of my invention and it is my intention to cover by my claims, any modified forms of structure or use of mechanical equivalents, which may be reasonably included within their scope.

I claim as my invention:

1. In a fowl picking apparatus, a pair of spaced revolving rollers, means for passing a fowl between said rollers, resilient hollow fingers projecting from said rollers, perforations in said fingers and means for exhausting air from said fingers whereby to pick feathers from said bowl and retain them against said fingers.

2. In a fowl picking apparatus, a pair of spaced revolving rollers, means for passing a fowl between said rollers, resilient hollow fingers projecting from said rollers, perforations in said fingers and means for exhausting air from said fingers during a portion of each revolution thereof whereby to pick feathers from said fowl and retain them against said fingers and means for allowing air to re-enter said fingers during another portion of each revolution thereof whereby to release said feathers from the fingers.

3. In a fowl picking apparatus, a pair of spaced revolving rollers, means for passing a fowl between said rollers, resilient hollow fingers projecting from said rollers, perforations in said fingers and means for exhausting air from said fingers during a portion of each revolution thereof whereby to pick feathers from said fowl and retain them against said fingers and means for introducing compressed air into said fingers during another portion of each revolution thereof whereby to discharge the feathers from the fingers.

4. In a fowl picking apparatus, hollow fingers, means for moving said fingers relative to the skin of a fowl, perforations in said fingers and means for exhausting air from said fingers whereby to pick feathers from said fowl and retain them against the surfaces of said fingers and means to remove the feathers from the surfaces of said fingers.

5. In a fowl picking apparatus, hollow fingers, means for moving said fingers relative to the skin of a fowl, perforations in said fingers, means for exhausting air from said fingers whereby to pick feathers from said fowl and retain them against said fingers and means for allowing air to re-enter said fingers whereby to release the feathers therefrom.

6. In a fowl picking apparatus, hollow fingers, means for moving said fingers relative to the skin of a fowl, perforations in said fingers, means for exhausting air from said fingers whereby to pick feathers from said fowl and retain them against said fingers and means for introducing compressed air into said fingers whereby to discharge the feathers therefrom.

Des Moines, Iowa, October 30, 1930.

OSCAR W. SWANSON.